United States Patent
Sano et al.

(10) Patent No.: US 10,664,774 B2
(45) Date of Patent: May 26, 2020

(54) CARPOOL SYSTEM

(71) Applicant: HONDA MOTOR CO., LTD., Minato-ku, Tokyo (JP)

(72) Inventors: Takaichi Sano, Wako (JP); Seiichi Yamamoto, Tokyo (JP); Miyuki Shimota, Wako (JP); Atsushi Nishi, Wako (JP); Makoto Yuzawa, Wako (JP); Keiichi Iguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/010,610

(22) Filed: Jun. 18, 2018

(65) Prior Publication Data

US 2018/0374016 A1 Dec. 27, 2018

(30) Foreign Application Priority Data

Jun. 21, 2017 (JP) .................................. 2017-121355

(51) Int. Cl.
| | | |
|---|---|---|
| G05D 1/00 | (2006.01) | |
| G06Q 10/02 | (2012.01) | |
| G06Q 10/06 | (2012.01) | |
| G05D 1/02 | (2020.01) | |

(52) U.S. Cl.
CPC ..... *G06Q 10/06311* (2013.01); *G05D 1/0088* (2013.01); *G05D 1/0212* (2013.01); *G05D 2201/0212* (2013.01)

(58) Field of Classification Search
None
See application file for complete search history.

(56) References Cited

U.S. PATENT DOCUMENTS

| | | | |
|---|---|---|---|
| 10,147,325 B1* | 12/2018 | Copeland | G08G 1/202 |
| 2009/0248587 A1* | 10/2009 | Van Buskirk | G06Q 10/06 |
| | | | 705/80 |
| 2011/0163866 A1* | 7/2011 | Ghannam | B60J 3/04 |
| | | | 340/449 |
| 2018/0267526 A1* | 9/2018 | Makke | B60W 30/00 |

(Continued)

FOREIGN PATENT DOCUMENTS

| | | |
|---|---|---|
| JP | 58-066781 | 5/1983 |
| JP | 2002-087061 | 3/2002 |
| JP | 2003-044702 | 2/2003 |

(Continued)

OTHER PUBLICATIONS

Japanese Office Action for Japanese Patent Application No. 2017-121355 dated Feb. 12, 2019.

*Primary Examiner* — Genna M Mott
*Assistant Examiner* — Melanie J Patrick
(74) *Attorney, Agent, or Firm* — Amin, Turocy & Watson, LLP

(57) ABSTRACT

A carpool system is a system in which a vehicle that can autonomously travel on a predetermined route or a route based on a request of each of a plurality of users is used communally by the plurality of users. The carpool system includes a riding condition setting unit configured to set an attribute of each of the plurality of users as a riding condition for the users, and an attribute determination unit configured to, when the user rides the vehicle or reserves the vehicle for riding, determine whether the attribute of the user satisfies the riding condition.

7 Claims, 12 Drawing Sheets

(56) References Cited

U.S. PATENT DOCUMENTS

2018/0342034 A1* 11/2018 Kislovskiy ............. G06Q 50/30

FOREIGN PATENT DOCUMENTS

| JP | 2004190233 A | * | 7/2004 |
| JP | 2010-092189 | | 4/2010 |
| JP | 2013-029341 | | 2/2013 |
| JP | 6015467 | | 8/2014 |

* cited by examiner

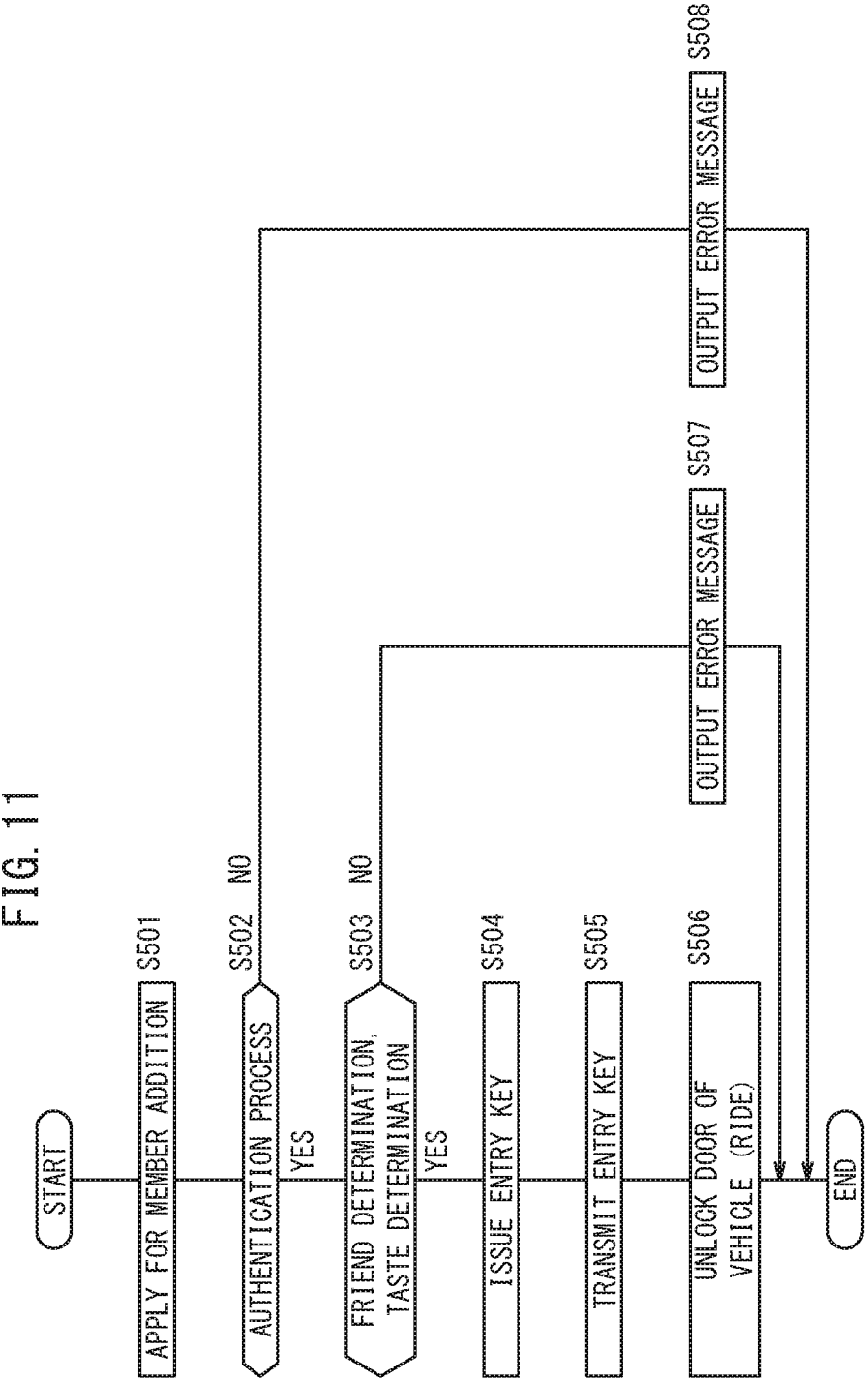

CARPOOL SYSTEM

CROSS-REFERENCE TO RELATED APPLICATION

This application is based upon and claims the benefit of priority from Japanese Patent Application No. 2017-121355 filed on Jun. 21, 2017, the contents of which are incorporated herein by reference.

BACKGROUND OF THE INVENTION

Field of the Invention

The present invention relates to a carpool system in which a vehicle is used communally by a plurality of users.

Description of the Related Art

A carpooler search device according to Japanese Patent No. 6015467 is configured to, in response to a request from one user, search for another user who can share a ride with the one user, and an object of this carpooler search device is to enable a search for a person who shares a ride, on the basis of an attribute of the person.

In order to achieve the object, the carpooler search device according to Japanese Patent No. 6015467 includes a user information storage means, a search request acquisition means, a matching degree calculation means, and an information provision means.

The user information storage means stores movement information including a plurality of elements regarding a movement of a user and including a departure place and a destination as the elements, and attribute information including a plurality of elements regarding a personal attribute of the user, in association with the user. The search request acquisition means acquires a search request transmitted from the user. The matching degree calculation means calculates a matching degree between the user who has transmitted the search request and another user, by using the movement information and the attribute information of the user who has transmitted the search request and the movement information and the attribute information of the other user. The information provision means generates candidate information indicative of carpooler candidates on the basis of the calculated matching degree, and provides the candidate information to the user who has transmitted the search request.

SUMMARY OF THE INVENTION

When a search for a carpooler is performed in advance in the system according to Japanese Patent No. 6015467, even if the system has found a matched person, e.g., a person who has a common taste, or a friend, there is a risk that, in the actual riding, the person who made the reservation might ride a wrong vehicle or a person who has no reservation might ride the vehicle by mistake.

The present invention has been made in order to solve such a problem, and an object is to provide a carpool system in which at least a carpooler that was determined to match a condition at a reservation can ride a reserved vehicle.

[1] A carpool system according to an aspect of the present invention is a carpool system in which an automated driving vehicle (hereinafter, referred to as vehicle) that can autonomously travel on a predetermined route or a route based on a request of each of a plurality of users is used communally by the plurality of users, and the system includes: a riding condition setting unit configured to set an attribute of each of the plurality of users as a riding condition for the users; and an attribute determination unit configured to, when the user rides the automated driving vehicle or reserves the automated driving vehicle for riding, determine whether the attribute of the user satisfies the riding condition.

When a search for a carpooler (user) is performed in advance, even if the system has found a matched person, e.g., a person who has a common taste, or a friend, there is a case where, in the actual riding, the person who made the reservation might mistakenly ride another vehicle, or a person who has no reservation might ride the vehicle by mistake.

In the present invention, however, when a user rides the vehicle or reserves the vehicle for riding, whether the attribute of the user satisfies the riding condition is determined. Therefore, at least the carpooler that was determined to match the condition at the reservation can ride the reserved vehicle. Needless to say, a person who did not make the reservation in advance can ride the vehicle if the person satisfies the riding condition. That is, it is possible to flexibly deal with an adventitious participant.

[2] In the aspect of the present invention, the vehicle may include: a speaker configured to reproduce a sound at a predetermined volume or more; and a destination setting unit configured to set as a destination, a site where a density level of buildings is less than or equal to a first predetermined value.

When the users hold an event with a large sound, such as listening to music, performing music with instruments, or playing an online game, it is possible to set a site or a space where the density level of the buildings is low, such as an open space or a vacant lot, as the destination of the vehicle. Therefore, the users can enjoy listening to music, performing music with the instruments, or the like, without regard for the people around the vehicle. Needless to say, the users can also enjoy a chat, a party, or the like.

[3] In the aspect of the present invention, the carpool system may further include a travel route setting unit configured to select a route where the density level is less than or equal to a second predetermined value, as a route to the destination, wherein the second predetermined value is higher than the first predetermined value.

While the vehicle is running to the destination, the users may have a chat, have a party, listen to music, or the like in the vehicle. In this case, the sound in the vehicle might leak to the outside. Under such circumstances, in the present invention, the route where the density level of the buildings is less than or equal to the second predetermined value is selected as the route to the destination. Owing thereto, while the vehicle is running, the users can enjoy a chat or a party, listen to music, or the like without regard for the people around the vehicle.

[4] In the aspect of the present invention, the first predetermined value may be in the range from 20% to 30% and the second predetermined value may be in the range from 30% to 40%.

[5] In the aspect of the present invention, the carpool system may further include a component configured to adjust visibility from an outside of the vehicle to an inside of the vehicle.

For example, people can see the users (for example, professional musicians) play the instrument inside the vehicle, from the outside of the vehicle. Thus, the vehicle can be used for a promotion, for example. In this case, the component may be a liquid crystal shutter.

[6] In the aspect of the present invention, a vehicle compartment of the vehicle may include an activity facility configured to achieve a common purpose of the users.

For example, when the users play the instruments, the users only has to prepare and bring their own instruments because a guitar amplifier, a bass amplifier, a drum set, a speaker, and the like are set in advance as the activity facility in the vehicle. That is, the users can use the vehicle as if they played the instruments in a music studio. Needless to say, if the activity facility is a facility where people can have a meal, the users can have a party, a chat, or the like in the vehicle.

[7] In the aspect of the present invention, the carpool system may further include an entry key issue unit configured to, when the user rides the automated driving vehicle or reserves the automated driving vehicle for riding, issue an entry key if the attribute of the user satisfies the riding condition, and a door unlock processing unit configured to, if the entry key that is transmitted when the user rides the automated driving vehicle matches the automated driving vehicle, unlock a door of the automated driving vehicle.

In the carpool system according to the present invention, at least a carpooler that was determined to match the condition at the reservation can ride the reserved vehicle.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 11 is a flowchart showing how to deal with member addition in the second carpool system.

DESCRIPTION OF THE PREFERRED EMBODIMENTS

Preferred embodiments of a carpool system according to the present invention are described below with reference to FIG. 1 to FIG. 12B.

Figure 1:
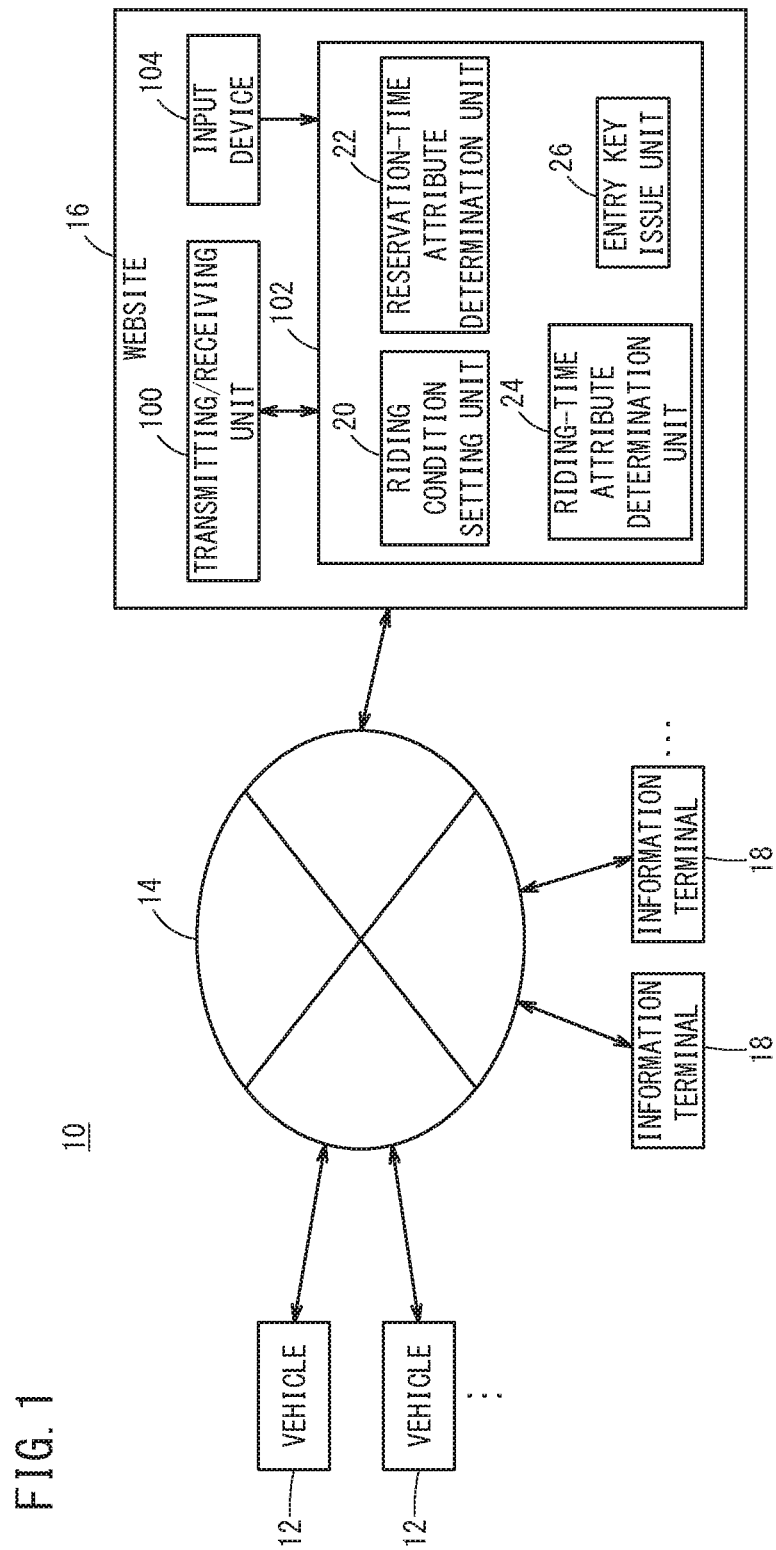
FIG. 1 is a block diagram illustrating a carpool system according to an embodiment of the present invention.
Figure 2:
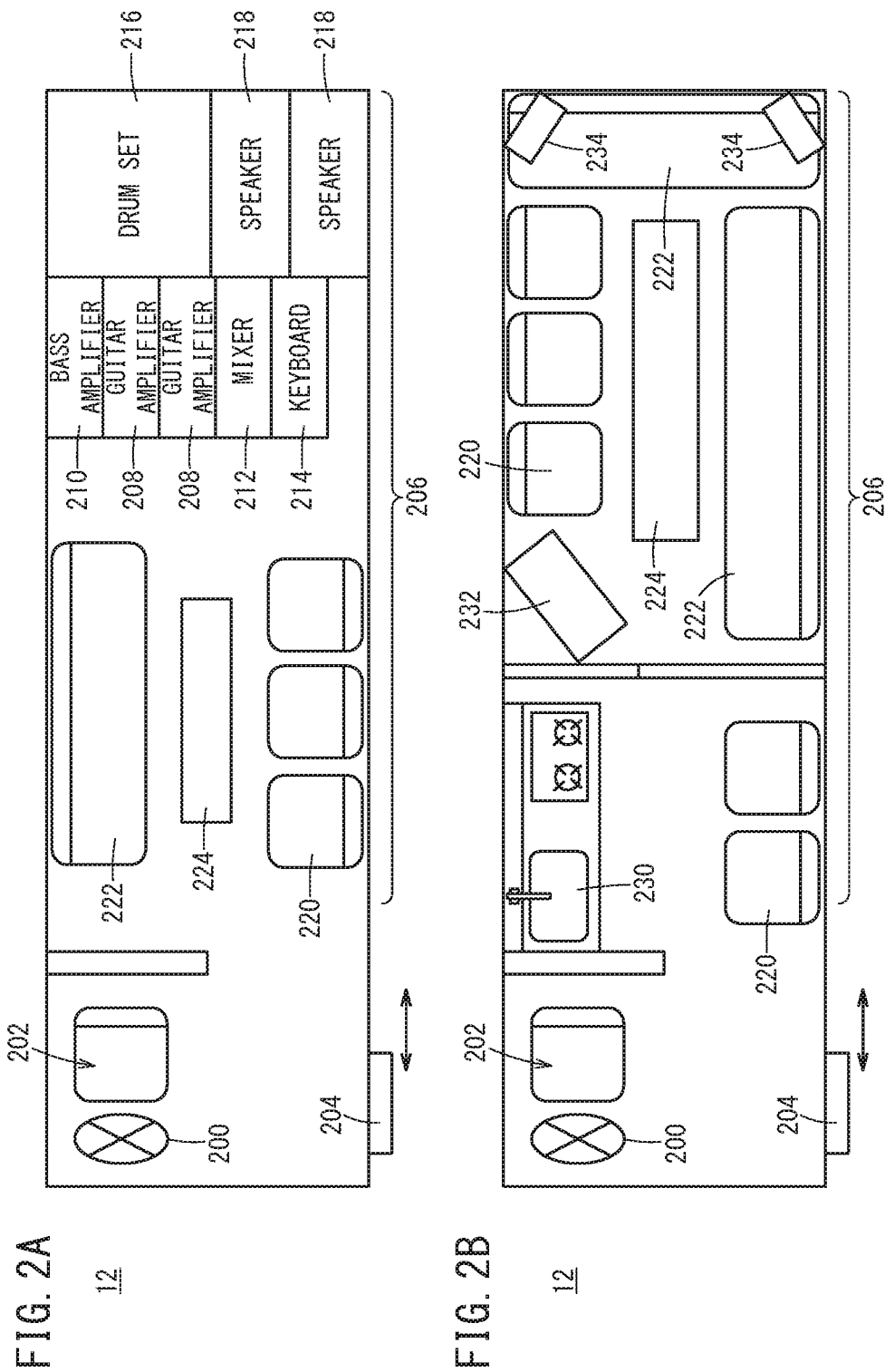
FIG. 2A is a plane view illustrating an example of an activity facility provided in a vehicle for a band (music)
FIG. 2B is a plane view illustrating another example of the activity facility provided in the vehicle for a club.

First, as illustrated in FIG. 1, a carpool system 10 according to the present embodiment includes at least the following components: one or more automated driving vehicles (hereinafter, simply referred to as vehicle 12), a website 16 connected to a network 14, and personal computers (PC) or mobile information terminals owned by users, for example. In the following description, the personal computer and the mobile information terminal are simply referred to as an information terminal 18.

The users mainly contain members who are each registered with the website 16. Each of the members inputs and registers at least the following items by using the information terminal 18, for example: the member's own name, his/her mail address, his/her address, his/her friend's name, his/her likes and tastes (favorite artist, actor, actress, music genre, favorite online game, favorite main and supporting characters in animation, favorite idol, name of offline meeting to which he/she belongs, and name of his/her band, for example), and the like.

The vehicle 12 is a vehicle that can autonomously travel on a predetermined route or a route based on a user's request. For example, the vehicle 12 calculates a route to a destination that is set, and controls partially or entirely a driving force device, a steering device, and a braking device in accordance with an action plan that is sequentially generated on the basis of the calculated route.

The website 16 includes a riding condition setting unit 20 (setting a club, a band (music), and the like), a unit for determining an attribute at the time of making reservations (which will be hereinafter referred to as a reservation-time attribute determination unit 22), a unit for determining an attribute at the time of riding (which will be hereinafter referred to as a riding-time attribute determination unit 24), an entry key issue unit 26, and the like.

The website 16 includes a transmitting/receiving unit 100 and a computer 102 including one or more central processing units (CPUs), and also includes a main memory (not shown) and various function units (the riding condition setting unit 20 as described above, for example). Note that, in this embodiment, each of the various function units is a software function unit in which the CPU executes programs stored in the main memory to thereby achieve each function. However, each of the various function units may be achieved by a hardware function unit including an integrated circuit such as a field-programmable gate array (FPGA). The same applies to a first carpool system 10A and a second carpool system 10B as will be described below with reference to FIG. 4 and the subsequent drawings.

As illustrated in FIG. 1, the riding condition setting unit 20 sets a riding condition of the vehicle 12. For example, the riding condition is set based on information input by an event organizer or the like using an input device 104 such as a keyboard connected to the computer 102. The riding condition includes the members' favorite events, the members' likes and tastes, and the like. The events include, for example, the activity of a club, a band, and the like. The club indicates a group of people who have a common taste or the like and meet together regularly or irregularly. For example, the club includes a music appreciation club, a music competition, a game competition, a get-together, a costume party, a support group, and an offline meeting. The band (music) indicates a group of people who bring their favorite musical instruments and perform music with the instruments. The music includes rock and roll, jazz, fusion, folk songs, and the like. The band may also include a group of professional musicians.

Therefore, it is preferable to prepare a plurality of vehicles 12 in accordance with the events. For example, as illustrated in FIG. 2A, a vehicle compartment of the vehicle 12 for the band is provided with a driver's seat 202 including a steering wheel 200 and a door 204, and moreover, as activity facilities 206, guitar amplifiers 208, a bass amplifier 210, a mixer (mixing console) 212, a keyboard (keyboard for music) 214, a drum set 216, speakers 218, chairs 220, a sofa 222, a table 224, and the like. In another example, as illustrated in FIG. 2B, the vehicle compartment of the vehicle 12 for the club is provided with the driver's seat 202, and moreover, as the activity facilities 206, a kitchen 230 for cooking, the chairs 220, the sofa 222, the table 224, and the like. Needless to say, if the vehicle 12 is for karaoke, dance, or the like, the vehicle compartment of the vehicle 12 is provided with a karaoke device 232, small speakers 234, a mirror ball (not shown), and the like.

When a member makes a reservation of a vehicle 12 with a riding condition being set in the vehicle, the reservation-time attribute determination unit 22 determines whether the member can ride the vehicle 12 on the basis of the member's attribute. If the attribute meets the riding condition, for example, the reservation-time attribute determination unit 22 issues an entry key for riding the vehicle 12 (entry key for unlocking the door 204 of the vehicle 12) through the entry key issue unit 26. The entry key contains information of a number that specifies the vehicle 12, an ID of the member, and the like. When the entry key is issued, it is preferable that the entry key (data) is transmitted to the information terminal 18 of the member having the attribute that meets the condition, through the transmitting/receiving unit 100 and the network 14, for example.

When another member than the member who made the reservation rides the vehicle 12, the riding-time attribute determination unit 24 determines whether the other member can ride the vehicle 12 on the basis of the other member's attribute. In this case also, if the attribute meets the riding condition, for example, the entry key for riding the vehicle 12 is issued through the entry key issue unit 26.

Figure 3:
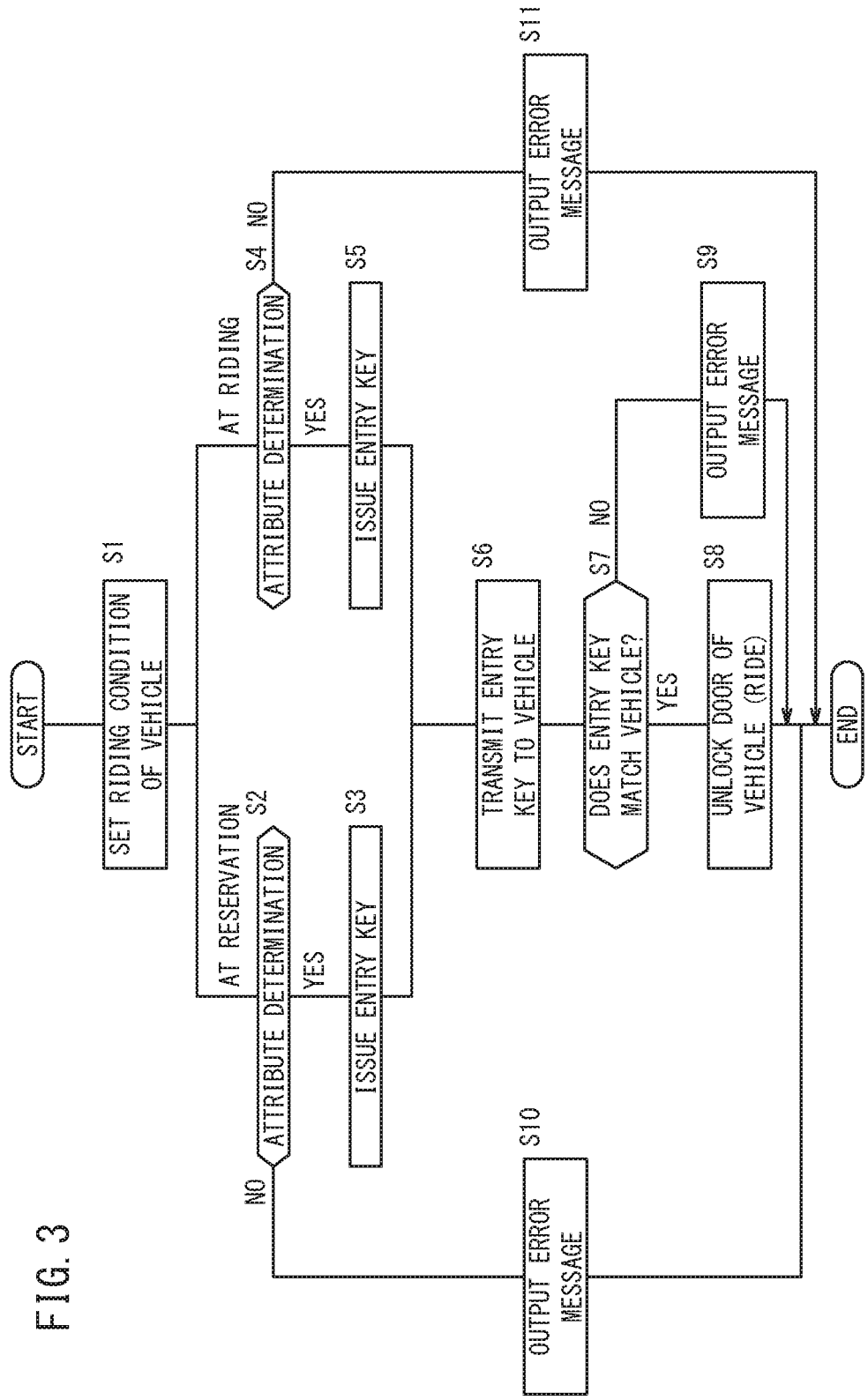
FIG. 3 is a flowchart of a process in the carpool system.

Here, description is made of a process of the carpool system 10 according to the present embodiment with reference to FIG. 3.

First, in step S1 in FIG. 3, the riding condition setting unit 20 sets the riding condition of the vehicle 12.

After that, in step S2, when a member makes a reservation of the vehicle 12 having the set riding condition, the reservation-time attribute determination unit 22 determines whether the member can ride the vehicle 12 on the basis of the member's attribute. If the attribute satisfies the riding condition (step S2: YES), the process advances to step S3, and the reservation-time attribute determination unit 22 permits the member to ride the vehicle 12. For example, the entry key for riding the vehicle 12 is issued through the entry key issue unit 26.

On the other hand, in step S4, when another member than the member who made the reservation rides the vehicle 12, the riding-time attribute determination unit 24 determines whether the other member can ride the vehicle 12 on the basis of the other member's attribute. If the attribute satisfies the riding condition (step S4: YES), the process advances to step S5, and the riding-time attribute determination unit 24 permits the other member to ride the vehicle 12. For example, the entry key for riding the vehicle 12 is issued through the entry key issue unit 26.

In step S6, the members that are permitted to ride the vehicle 12 transmit the entry key to the vehicle 12 when the members ride the vehicle 12.

In step S7, a door unlock processing unit 46 of the vehicle 12 determines whether the transmitted entry key matches the vehicle 12. If the entry key matches the vehicle 12 (step S7: YES), in step S8, the door is unlocked. Thus, the member who is permitted to ride can ride the vehicle 12. If the entry key does not match the vehicle 12 (step S7: NO), in step S9, the door unlock processing unit 46 does not unlock the door, and outputs an error message indicating that the vehicle 12 is wrong for riding, for example.

If it is determined that the attribute of the member does not satisfy the riding condition in step S2 or step S4 (step S2 or step S4: NO), the process advances to step S10 or step S11, and an error message indicating that the attribute does not satisfy the riding condition is output.

Next, examples of the above carpool system 10 will be described with reference to FIG. 4 to FIG. 11.

First, description is made of the carpool system according to a first example that is suitable for the club or the like (hereinafter, referred to as first carpool system 10A).

Figure 4:
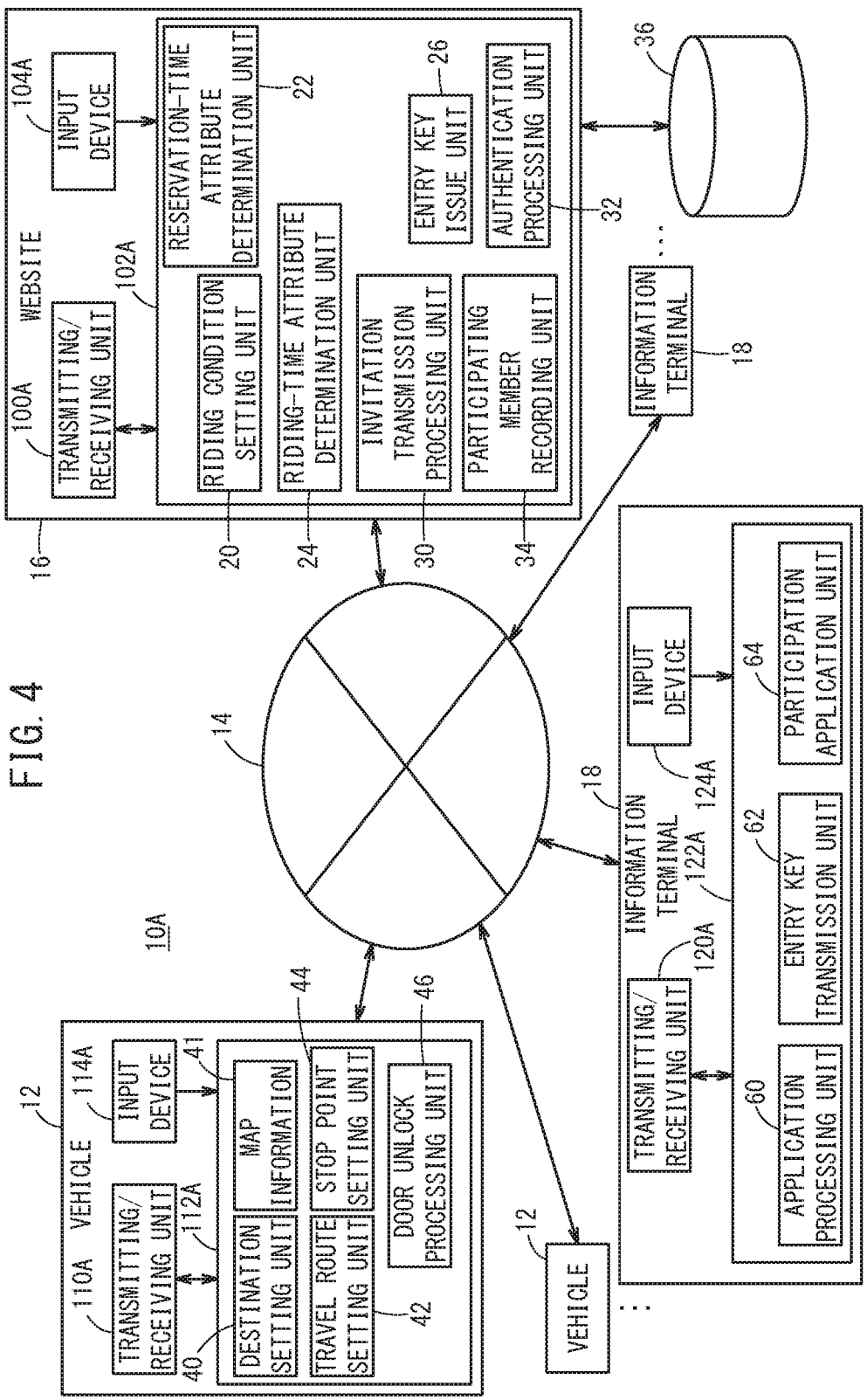
FIG. 4 is a block diagram illustrating a carpool system (first carpool system) according to a first example.

As illustrated in FIG. 4, the first carpool system 10A includes the vehicles 12, the website 16, and the information terminals 18.

The website 16 includes an invitation transmission processing unit 30, an authentication processing unit 32, a participating member recording unit 34, the above riding condition setting unit 20, the above reservation-time attribute determination unit 22, and the above riding-time attribute determination unit 24.

That is to say, a computer 102A for the website 16 according to the first carpool system 10A includes a main memory and various function units (for example, the riding condition setting unit 20 as described above and the invitation transmission processing unit 30).

The invitation transmission processing unit 30 transmits an invitation of an event to the information terminals 18 of the members through a transmitting/receiving unit 100A and the network 14. The invitation may be sent by e-mail or posted on a homepage. The invitation includes a schedule of the event and the like.

When the website 16 is accessed, the authentication processing unit 32 determines whether the person who has accessed the website 16 is one of the members.

The participating member recording unit 34 records information of participating members for each event in a database 36 connected to the website 16, on the basis of the contents of the entry keys received through the vehicle 12. This information may be used for grasping a popular trend for each event or charging the member taking part in the event, for example.

The vehicle 12 includes a destination setting unit 40, a travel route setting unit 42, a stop point setting unit 44, and the door unlock processing unit 46.

As illustrated in FIG. 4, the vehicle 12 includes a transmitting/receiving unit 110A and a computer 112A including one or more CPUs, and moreover, the main memory (not shown) and various function units (the destination setting unit 40 described above, for example). Note that, in this embodiment, each of the various function units is a software function unit in which the CPU executes programs stored in the main memory to thereby achieve each function. However, each of the various function units may be achieved by a hardware function unit including an integrated circuit such as a FPGA. The same applies to a second carpool system 10B as will be described below with reference to FIG. 8 and the subsequent drawings.

Figure 5:
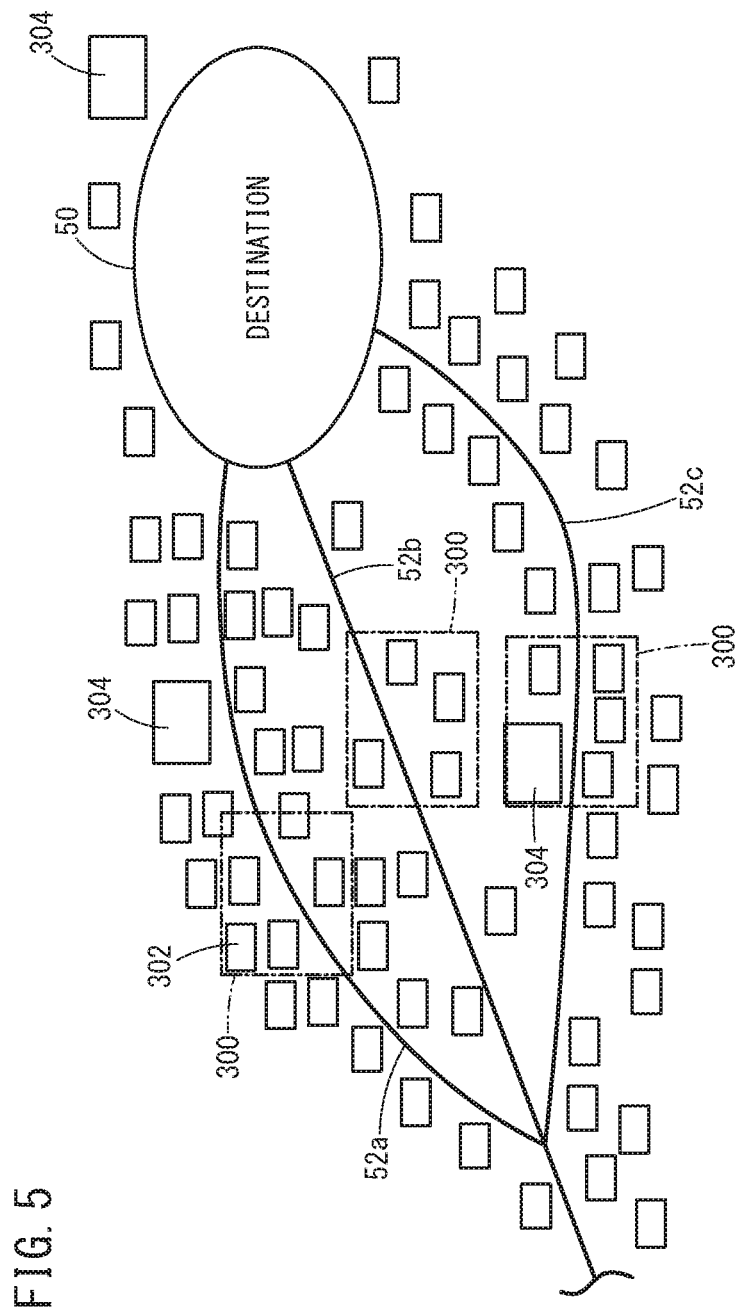
FIG. 5 is an explanatory view illustrating an example in which there are a plurality of routes to a destination.

As illustrated in FIG. 5, the destination setting unit 40 sets a destination 50 where the event is held. The destination 50 may be set in advance or set in accordance with the volume of a sound generated by the vehicle 12 itself during travel, or a sound generated from the vehicle compartment, such as speaking voice or singing voice of participants, or a sound generated from the speakers, for example.

At the destination 50, if sound is reproduced at a predetermined volume or more from the speaker set in the vehicle 12 or the speaker that is carried out of the vehicle 12, for example, in the music appreciation event, the karaoke, or a projection mapping with a large volume of music, and a noise level is, for example, 80 dB or more, a site or a space where the density level of buildings is less than or equal to a first predetermined value is set as the destination 50.

The density level is obtained from an area of a certain land 300 that is set in advance and a total area of one or more buildings 302 that are built on the land 300. Specifically, the density level can be obtained according to the following mathematical expression: (total area of buildings 302/area of certain land)×100(%). In this case, the buildings 302 do not include a facility that generates a large sound, such as a factory 304. The area of the certain land 300 may be 1 hectare or 10 hectares, for example. The first predetermined value is in the range from 20% to 30%, for example. Needless to say, the first predetermined value may be selected in accordance with the noise level.

The site where the density level of the buildings 302 is less than or equal to the first predetermined value is detected by using map information 41 acquired through the network 14 or map information 41 stored in a navigation device mounted in the vehicle 12, for example. If there are a plurality of detected sites, for example, the nearest site or a site with the lowest density level may be automatically selected, or a driver may manually select a site by using an input device 114A.

If main purpose of the event is having a chat such as the get-together or the offline meeting, the noise level will never be 80 dB or more. Thus, the vehicle 12 may go round in the destination 50 (circulation route). For example, one urban area may be selected as the destination 50, and the vehicle 12 may go round in the urban area.

The travel route setting unit 42 sets a route to the destination 50. If the participants are not enough, the route may include a place which has a large population, such as the urban area or an area in front of a station. While the vehicle 12 is running to the destination 50, the users may enjoy a chat, have a party, listen to music, or the like in the vehicle. In this case, the sound in the vehicle might leak to the outside. Thus, the travel route setting unit 42 selects a route where the density level of the buildings is less than or equal to a second predetermined value, as the route to the destination 50. The second predetermined value is higher than the first predetermined value, and is in the range from 30% to 40%, for example.

For example, as illustrated in FIG. 5, if the candidates for a route to the destination 50 include three routes 52a, 52b, and 52c, a route where the density level of the buildings 302 is less than or equal to the second predetermined value is selected. If the density level of the buildings 302 in any of the three routes 52a, 52b, and 52c is less or equal to the second predetermined value, a route with the lowest density level is automatically selected. Needless to say, if a plurality of routes is extracted, the driver may manually select one route by using the input device 114A, for example.

The stop point setting unit 44 sets a stop point on the route to the destination 50. For example, a house of a participating member, a riding point, or a rest point is set as the stop point. If the destination 50 is in the form of a circulation route, the stop point may be set in the destination 50. In this setting, the stop point may be automatically set in accordance with a routine that is set in advance by the computer 112A, or the driver may manually set the stop point by using the input device 114A, for example. If the stop points are set to the houses of the participating members, the participating members who are waiting at their houses can be picked up in order and brought to the destination 50. Thus, it is suitable for the cosplay event (i.e., costume-play event), for example.

When the participating member who has come close to the door 204 of the vehicle 12 transmits the entry key, for example, by using the information terminal 18, if the received entry key matches the vehicle 12, the door unlock processing unit 46 unlocks the door 204 to guide the participating member into the vehicle.

The information terminal 18 includes, as illustrated in FIG. 4, an application processing unit 60, an entry key transmission unit 62, and a participation application unit 64. In addition, the information terminal 18 includes a transmitting/receiving unit 120A and a computer 122A including one or more CPUs, and moreover, a main memory (not shown) and various function units (the application processing unit 60 described above, for example). Note that, in this embodiment, each of the various function units is a software function unit in which the CPU executes programs stored in the main memory to thereby achieve each function. However, each of the various function units may be achieved by a hardware function unit including an integrated circuit such as a FPGA. The same applies to the second carpool system 10B as will be described below with reference to FIG. 8 and the subsequent drawings.

If a member has expressed (input) his/her will to participate in an event by using the information terminal 18, the application processing unit 60 transmits to the website 16, a code indicating a participation application (including ID of the member, for example).

If the participating member has expressed (input) his/her will to ride the vehicle 12 by using the information terminal 18, the entry key transmission unit 62 transmits to the vehicle 12, the entry key that is acquired in advance.

If a member who did not sign up to participate in an event has expressed (input) his/her will to ride the vehicle 12 by using the information terminal 18 (participation application), the participation application unit 64 causes the member to log in to the website 16. If the member logs in to the website 16 through the participation application unit 64, the riding-time attribute determination unit 24 of the website 16 performs friend determination or taste determination. In the friend determination, whether the member who has applied for participation in the event is a friend of the participating member is determined. In the taste determination, whether the member who has applied for the participation has a taste that suits the content of the event is determined. If it is determined that the member who has applied for the participation is a friend of the participating member or has a taste that suits the content of the event, the entry key is issued to the member who has applied for the participation. That is, the entry key is transmitted to the information terminal 18 of the member who has applied for the participation.

Next, description will be given of a process of the first carpool system 10A with reference to FIG. 6.

Figure 6:
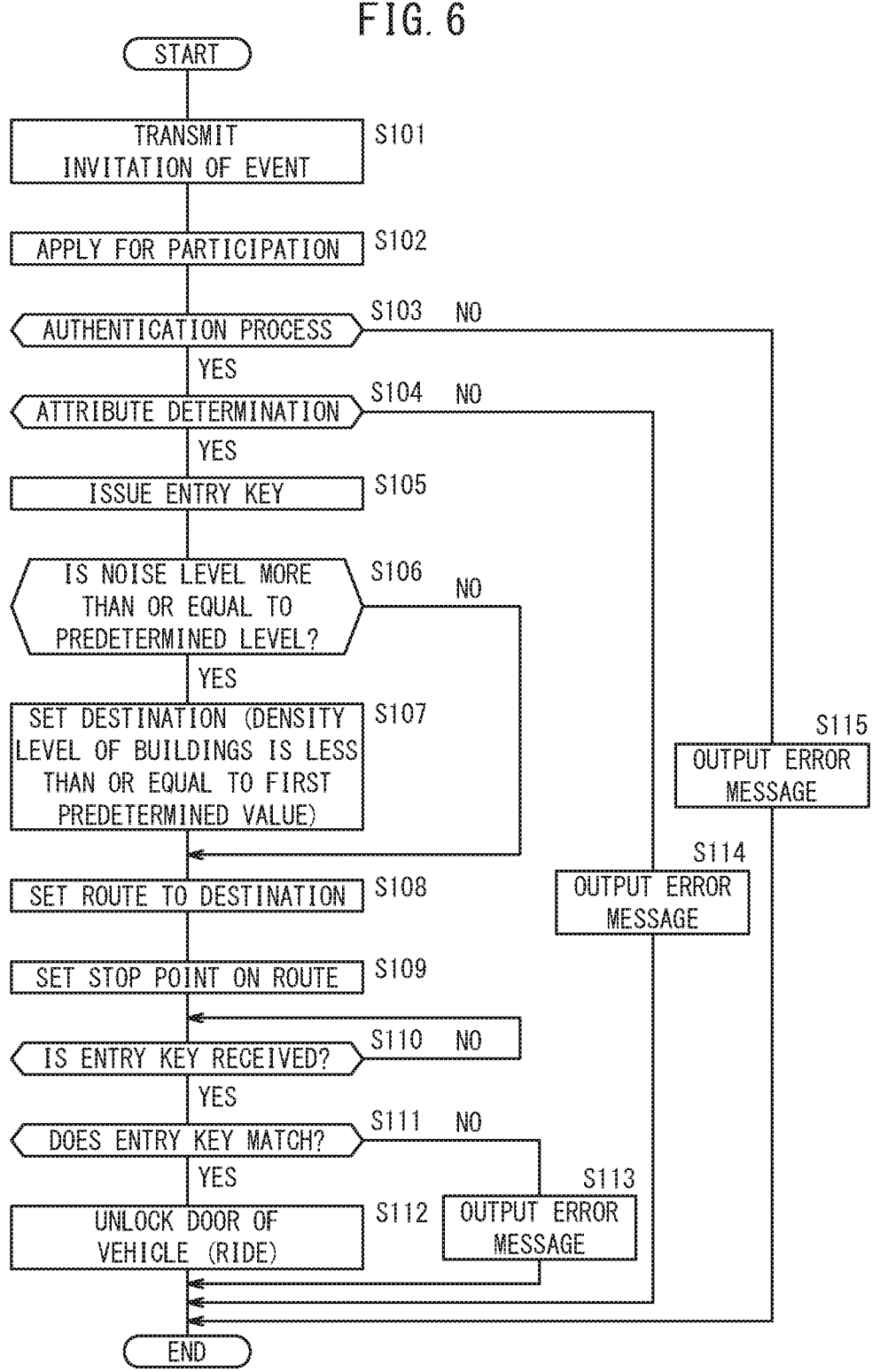
FIG. 6 is a flowchart of a process in the first carpool system.

First, in step S101 in FIG. 6, the invitation transmission processing unit 30 of the website 16 transmits the invitation of an event to the information terminals 18 of the members through the network 14. In step S102, if the member has expressed (input) his/her will to participate in the event, the application processing unit 60 of the information terminal 18 transmits to the website 16, the code indicating the participation application (including ID of the member, for example).

In step S103, when the website 16 is accessed, the authentication processing unit 32 determines whether the person who has accessed the website 16 is one of the registered members. If the person who has accessed the website 16 is the registered member (step S103: YES), the process advances to the next step S104, and the reservation-time attribute determination unit 22 determines the attribute of the taste of the member who has applied for participation in the event. If it is determined that the member who has applied for the participation has a taste that suits the content of the event (step S104: YES), the process advances to step S105, and the entry key issue unit 26 issues the entry key to the member who has applied for the participation. That is, the entry key is transmitted to the information terminal 18 of the member who has applied for the participation.

After that, in step S106, the destination setting unit 40 of the vehicle 12 determines whether sound is reproduced at a volume of a predetermined noise level or more, on the basis of the content of the event. If the sound is reproduced at the volume of the predetermined noise level or more (step S106: YES), the process advances to the next step S107, in which the destination setting unit 40 of the vehicle 12 sets, as the destination 50, a site or a space where the density level of buildings is less than or equal to the first predetermined value.

After the process in step S107 is completed or if it is determined that the sound is reproduced at the volume of less than the predetermined noise level in step S106 (step S106: NO), the process advances to step S108, in which the travel route setting unit 42 sets a route to the destination 50. Thereafter, in step S109, the stop point setting unit 44 sets a stop point on the route to the destination 50.

In step S110, when the vehicle 12 has reached the riding point that is set in advance, the house of the participating member, or the like, the door unlock processing unit 46 waits to receive the entry key.

The participating member transmits the entry key to the vehicle 12 that has reached the riding point, the house of the participating member, or the like. That is, the entry key transmission unit 62 of the information terminal 18 transmits the entry key on the basis of input operation indicating the entry key transmission by the participating member.

In step S110, the door unlock processing unit 46 waits to receive the entry key. If the entry key is received (step S110: YES), the process advances to the next step S111, in which the door unlock processing unit 46 determines whether the received entry key matches the vehicle 12. If the received entry key matches the vehicle 12 (step S111: YES), the door is unlocked in step S112. Then, the participating member rides the vehicle.

If the received entry key does not match the vehicle 12 (step S111: NO), the door unlock processing unit 46 outputs the error message indicating that the vehicle 12 is wrong for riding in step S113. In this case, the error message may be output by voice or displayed through the information terminal 18. In addition, a plate number of the vehicle 12 to ride or a position of the riding point may be displayed or output by voice.

On the other hand, if it is determined in step S104 that the member who has applied for the participation does not have a taste that suits the content of the event (step S104: NO), the process advances to step S114 and, for example, an error message indicating that no taste suits the content of the event is output.

If it is determined in step S103 that the person who has accessed the website 16 is not the registered member (step S103: NO), the process advances to step S115 and, for example, an error message indicating that the person who has accessed the website 16 is not the registered member is output. In addition, a message for prompting the person to resister with the website 16 may be output.

Next, description will be given of how to deal with unofficial participation with reference to a flowchart in FIG. 7.

The unofficial participation includes, for example, a case where a member who did not applied for participation in an event abruptly decides to participate in the event on the day of the event, or where a member who did not applied for participation happens to see the parked vehicle 12 and then has a sudden desire to participate in the event. In the description below, it is assumed that an unofficial participating member rides the vehicle 12.

Figure 7:
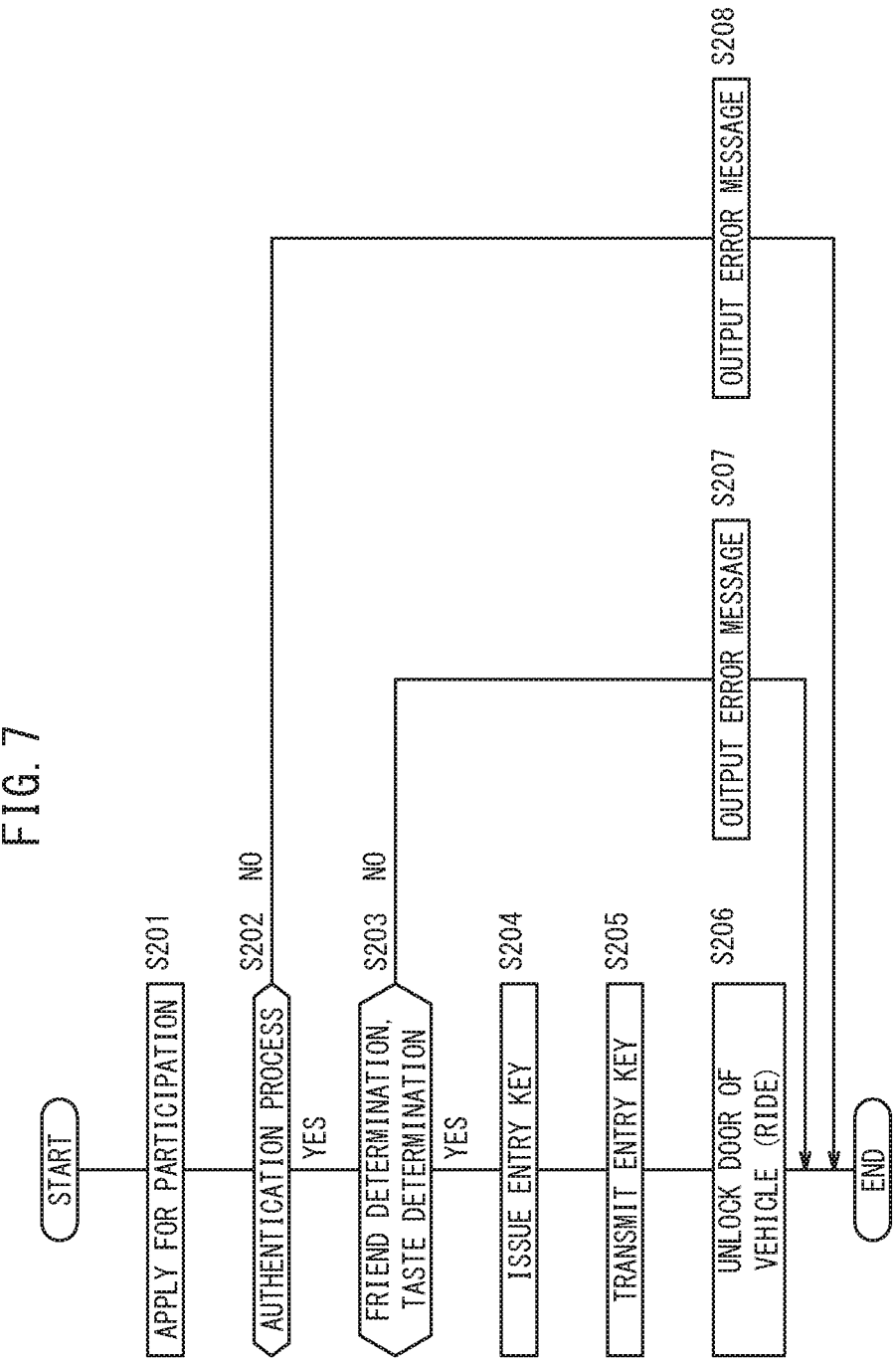
FIG. 7 is a flowchart showing how to deal with unofficial participation in the first carpool system.

First, in step S201 in FIG. 7, the participation application unit 64 of the information terminal 18 causes such a member to log in to the website 16 on the basis of the participation application input by the member. That is to say, the member applies for participation in an event.

If the website 16 is accessed, the authentication processing unit 32 of the website 16 determines whether the person who has accessed the website 16 is one of the registered members in step S202. If the person who has accessed the website 16 is the registered member (step S202: YES), the process advances to the next step S203, in which the riding-time attribute determination unit 24 performs the friend determination or the taste determination of the unofficial participating member. That is, whether the unofficial participating member has a friend in the official participating members is determined, or whether the unofficial participating member has a taste that suits the content of the event is determined. If it is determined that the unofficial participating member has a friend in the participating members or has a taste that suits the content of the event, that is, if a result of the friend determination or the taste determination indicates that the unofficial participating member satisfies the condition (step S203: YES), the process advances to step S204, and the entry key issue unit 26 issues the entry key to the unofficial participating member.

In step S205, the unofficial participating member transmits the entry key to the vehicle 12. That is, the entry key transmission unit 62 of the information terminal 18 transmits the entry key on the basis of the input indicating the entry key transmission of the unofficial participating member.

In step S206, the door unlock processing unit 46 unlocks the door upon reception of the entry key. Thus, the unofficial participating member can ride the vehicle 12.

If the result of the friend determination or the taste determination indicates that the unofficial participating member does not satisfy the condition in step S203 (step S203: NO), the process advances to step S207 and, for example, an error message indicating that the taste does not suit the content of the event is output.

If it is determined that the person who has accessed the website 16 is not the registered member in step S202 as above (step S202: NO), the process advances to step S208 and an error message is output in order to prompt the person to register with the website 16.

Next, with reference to FIG. 8 to FIG. 11, description will be given of the carpool system according to a second example that is suitable for the band (music), a promotion where the professional musicians (band) perform music with the instruments, or the like (hereinafter, referred to as second carpool system 10B).

In such a band event, generally the members are fixed. Therefore, unlike the first carpool system 10A, for example, the band leader calls the members for performance in the event. Note that the first carpool system 10A as described above is adopted in a case where not the band but many and unspecified music associates meet together and perform music at an open space, for example.

Figure 8:
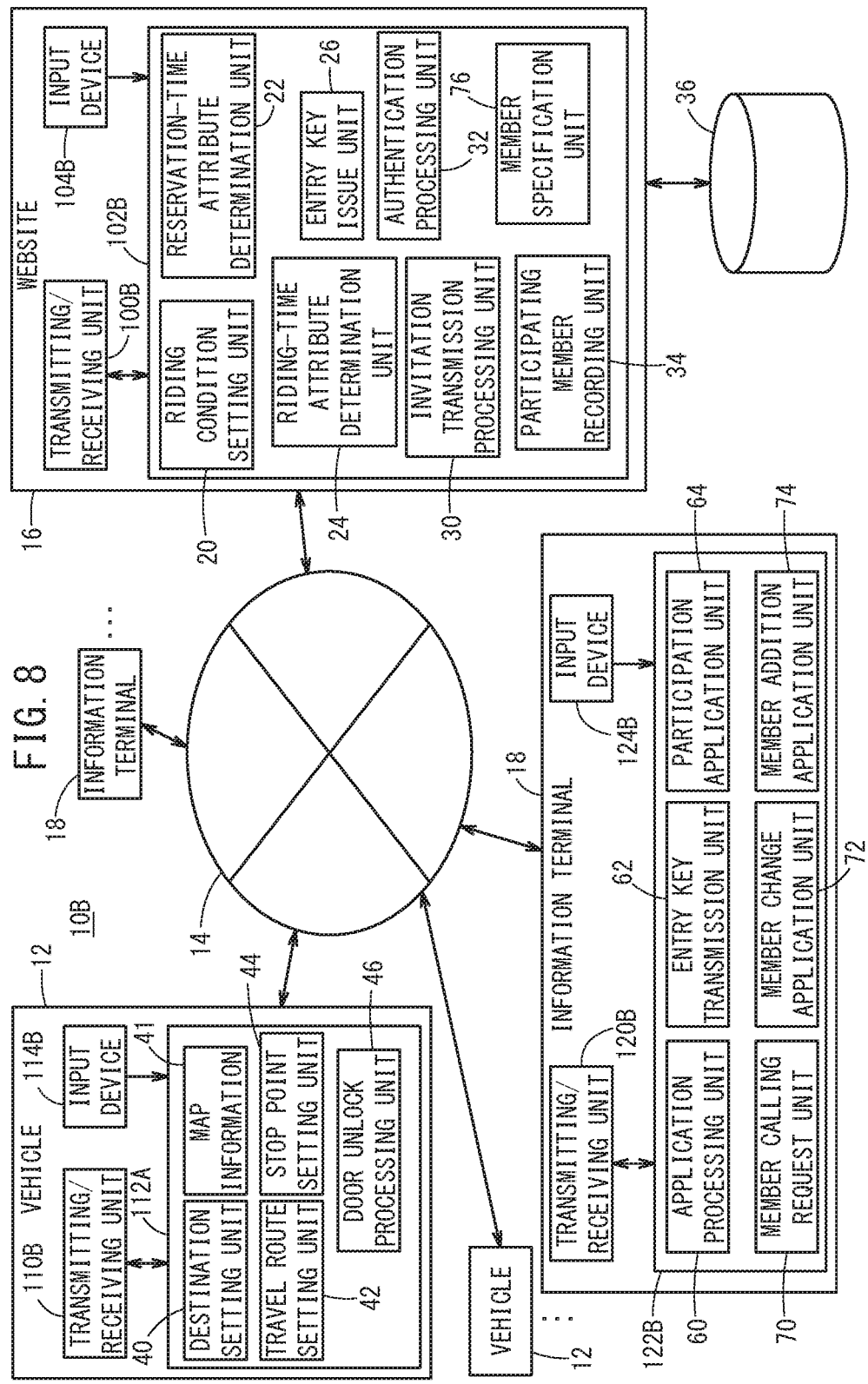
FIG. 8 is a block diagram illustrating a carpool system (second carpool system) according to a second example.

As illustrated in FIG. 8, this second carpool system 10B has a structure that is similar to that of the first carpool system 10A. However, the second carpool system 10B is different from the first carpool system 10A in that the information terminal 18 includes a member calling request unit 70, a member change application unit 72, and a member addition application unit 74, and the website 16 includes a member specification unit 76.

The member calling request unit 70 requests the website 16 to call the band associates or the band members (including professional musicians). Items in the request include a band name, a performance area (final destination is decided while the vehicle is traveling), and a schedule of the performance, and moreover, an ID that specifies the band or the like, if necessary. The member specification unit 76 of the website 16 specifies the target members to be called, on the basis of the band name, the ID, or the like in the request.

The member change application unit 72 and the member addition application unit 74 perform processing that is similar to that of the participation application unit 64 as described above. That is, the newly participating member through the member change or the member addition expresses (inputs) his/her will to ride the vehicle 12 (member change application, member addition application) and logs in to the website 16 using the information terminal 18.

If the newly participating member logs in to the website 16 through the member change application or the member addition application, the riding-time attribute determination unit 24 of the website 16 performs the friend determination or the taste determination. If it is determined that the newly participating member has a friend in the band members or has a taste that suits the music to be performed by the band, the entry key is issued to the member who has applied for the member change or the member addition. That is, the entry key is transmitted to the information terminal 18 of the member who has applied for the member change or the member addition.

Next, description will be given of a process of the second carpool system 10B with reference to FIG. 9.

Figure 9:
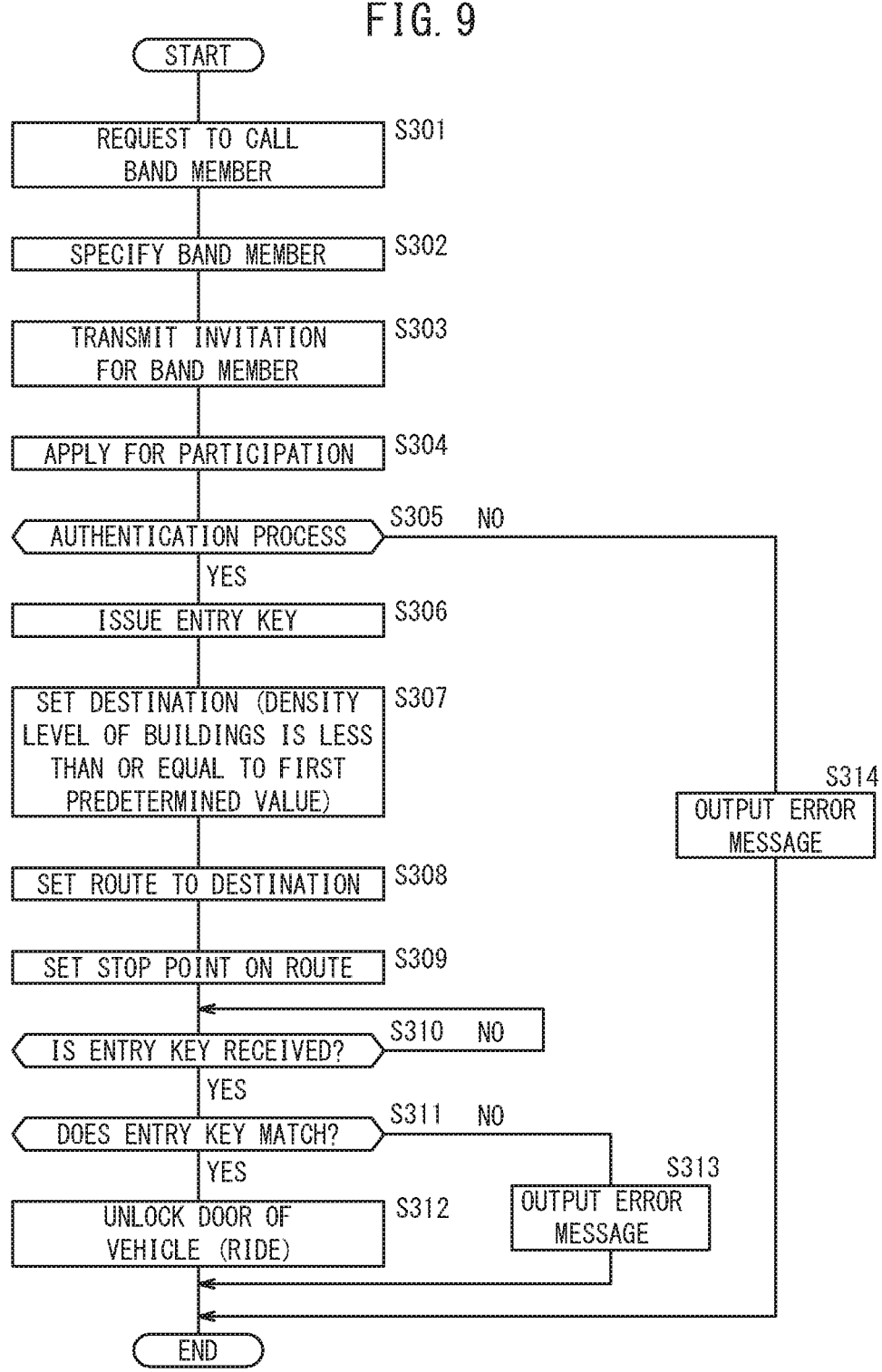
FIG. 9 is a flowchart of a process in the second carpool system.

First, in step S301 in FIG. 9, the leader of the band requests the website 16 to call the band associates or the band members, for example. In step S302, the reservation-time attribute determination unit 22 specifies the target members to be called, on the basis of the band name, the ID, or the like in the request.

In step S303, the invitation transmission processing unit 30 of the website 16 transmits an invitation or a notice for calling the band members, to the information terminals 18 of the specified members through the network 14. In step S304, each of the members who can participate in the event transmits to the website 16, the code indicating the participation application through the application processing unit 60 of the information terminal 18.

When the website 16 is accessed, the authentication processing unit 32 determines whether the person who has accessed the website 16 is one of the registered members in step S305. If the person who has accessed the website 16 is the registered member (step S305: YES), the process advances to the next step S306, and the entry key issue unit 26 issues the entry key to the member who has applied for the participation.

After that, in step S307, the destination setting unit 40 of the vehicle 12 sets, as the destination 50, a site or a space where the density level of buildings is less than or equal to the first predetermined value. In the performance of the band, the band usually performs music with the instruments at a large volume by using a large speaker that is set outdoors. Therefore, in the event where the band members perform music, a site or a space where the density level of buildings is less than or equal to the first predetermined value is set as the destination 50. Needless to say, in the music performance where no speaker is used, a site or a space where the density level of buildings is more than the first predetermined value may be set as the destination 50.

In step S308, the travel route setting unit 42 sets a route to the destination 50. Since the process in the travel route setting unit 42 is already described above, the explanation is omitted here. After that, in step S309, the stop point setting unit 44 sets a stop point or stop points on the route to the destination 50.

When the vehicle 12 has reached the riding point that is set in advance, the house of the participating member, or the like, the door unlock processing unit 46 waits to receive the entry key in step S310.

The band member transmits the entry key to the vehicle 12 that has reached the riding point, the house of the band member, or the like. That is, the entry key transmission unit 62 of the information terminal 18 transmits the entry key on the basis of the input indicating the entry key transmission of the band member.

If the entry key is received (step S310: YES), the process advances to the next step S311, and the door unlock processing unit 46 determines whether the received entry key matches the vehicle 12. If the received entry key matches the vehicle 12 (step S311: YES), the door is unlocked in step S312. Thus, the band member rides the vehicle 12. If the received entry key does not match the vehicle 12 (step S311: NO), the door unlock processing unit 46 outputs an error message indicating that the vehicle 12 is wrong for riding, in step S313.

If it is determined that the person who has accessed the website 16 is not the registered member in step S305 as above (step S305: NO), an error message is output in order to prompt the person to register with the website.

Next, description will be given of how to deal with the member change with reference to a flowchart in FIG. 10.

The member change includes, for example, a case where, when a regular band member cannot participate in the event on account of some business, the regular band member asks his/her friend or the like to participate in the event instead.

Figure 10:
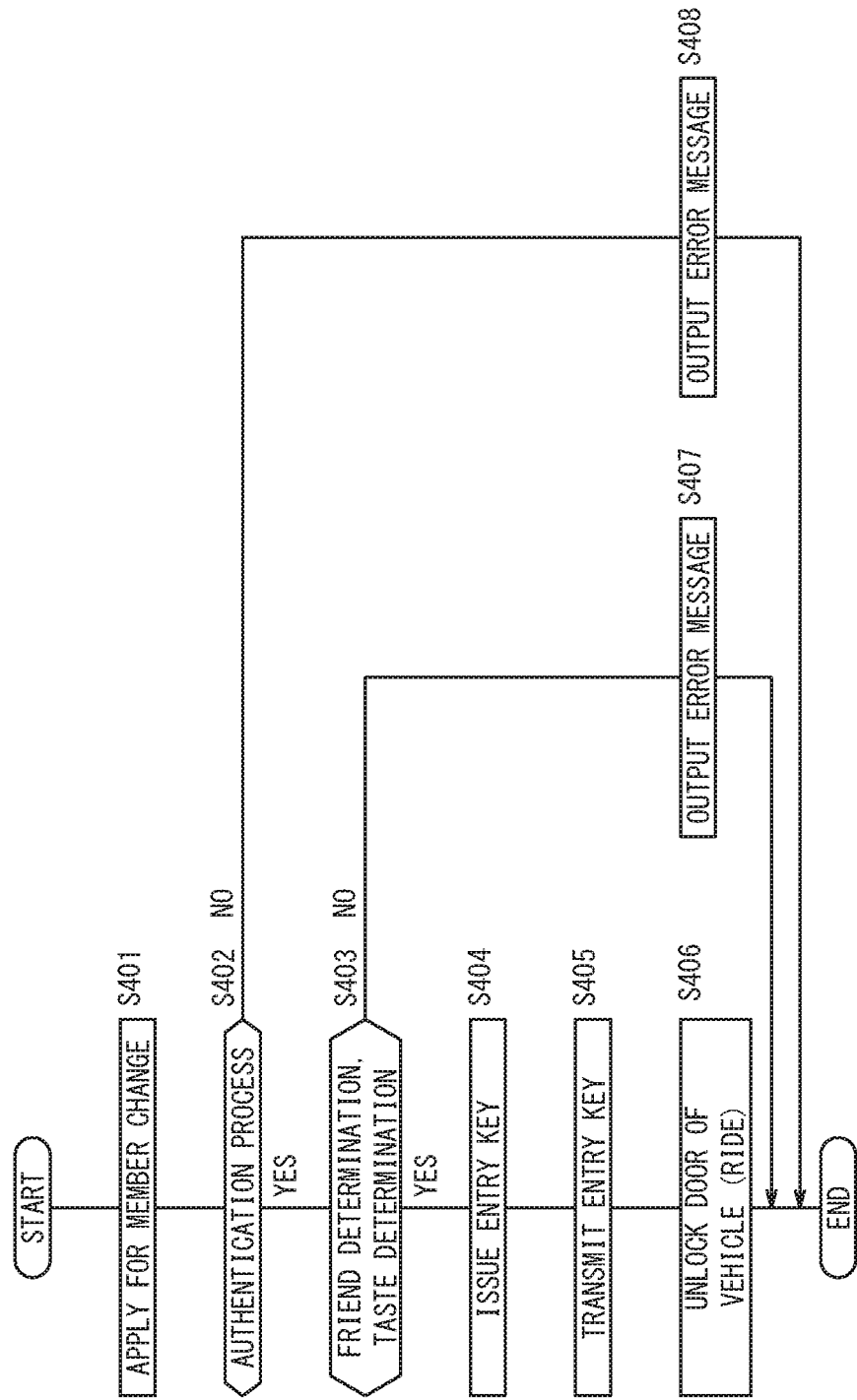
FIG. 10 is a flowchart showing how to deal with member change in the second carpool system.

First, in step S401 in FIG. 10, the member change application unit 72 of the information terminal 18 causes the member to log in to the website 16, on the basis of input of the member change application. In the description below, it is assumed that the member who is substituted for the regular band member (hereinafter, referred to as a change member) rides the vehicle 12.

If the website 16 is accessed, the authentication processing unit 32 of the website 16 determines whether the change member is the registered member in step S402. If the change member is the registered member (step S402: YES), the process advances to the next step S403 and the riding-time attribute determination unit 24 determines whether the change member has a friend in the regular band members (friend determination), or whether the change member has a taste that suits the music to be performed by the band, the style of the band, or the like (taste determination). If it is determined that the change member has a friend in the regular band members or has a taste that suits the music or the style (step S403: YES), the process advances to step S404, and the entry key issue unit 26 issues the entry key to the change member.

In step S405, the change member who has obtained the entry key transmits the entry key to the vehicle 12. In step S406, on receipt of the entry key, the door unlock processing unit 46 unlocks the door. Thus, the change member can ride the vehicle 12.

In step S403, if the result of the friend determination or the taste determination indicates that the change member does not satisfy the condition (step S403: NO), the process advances to step S407 and, for example, an error message indicating that the taste does not suit the music or the style is output.

If it is determined that the person who has accessed the website 16 is not the registered member in step S402 as above (step S402: NO), the process advances to step S408 and an error message is output in order to prompt the person to register with the website 16.

Next, description will be given of how to deal with the member addition with reference to a flowchart in FIG. 11.

The member addition includes, for example, a case where the regular band member brings his/her friend as a participating member and a case where a person adventitiously participates in the band, for example.

First, in step S501 in FIG. 11, the member addition application unit 74 of the information terminal 18 causes the member to log in to the website 16 on the basis of the input of the member addition application. In the description below, it is assumed that the member who is added (hereinafter, referred to as addition member) rides the vehicle 12.

If the website 16 is accessed, the authentication processing unit 32 of the website 16 determines whether the addition member is one of the registered members in step S502. If the addition member is the registered member, the process advances to the next step S503 and the riding-time attribute determination unit 24 determines whether the addition member has a friend in the regular band members (friend determination), or whether the addition member has a taste that suits the music to be performed by the band, the style of the band, or the like (taste determination). If it is determined that the addition member has a friend in the regular band members or has a taste that suits the music or the style, the process advances to step S504 and the entry key issue unit 26 issues the entry key to the addition member.

In step S505, the addition member who has obtained the entry key transmits the entry key to the vehicle 12.

In step S506, on receipt of the entry key, the door unlock processing unit 46 unlocks the door. Thus, the addition member can ride the vehicle 12.

In step S503, if the result of the friend determination or the taste determination indicates that the addition member does not satisfy the condition, the process advances to step S507 and, for example, an error message indicating that the taste does not suit the music or the style is output.

If it is determined that the person who has accessed the website 16 is not the registered member in step S502 as above, the process advances to step S508 and an error message is output in order to prompt the person to register with the website 16.

Figure 12A:
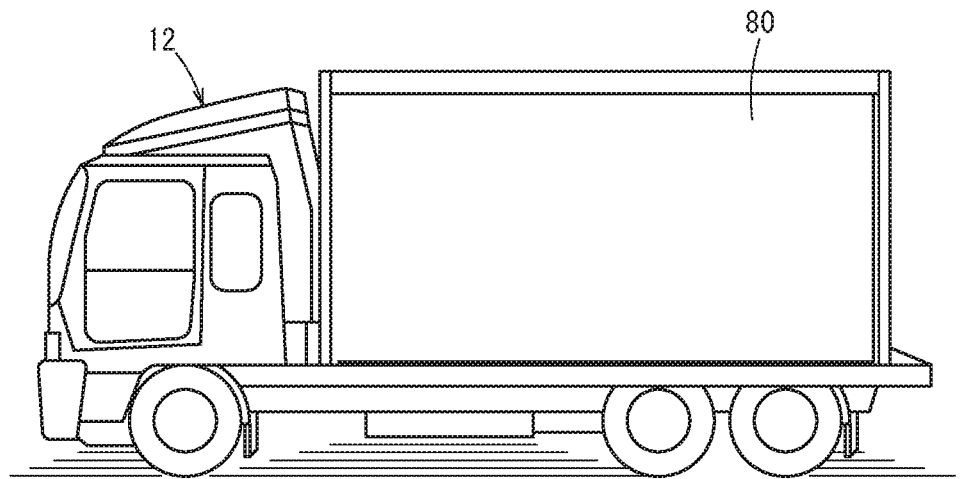
FIG. 12A and FIG. 12B are explanatory views that illustrate an example of a means for adjusting visibility from an outside of the vehicle to an inside thereof.
Figure 12B:
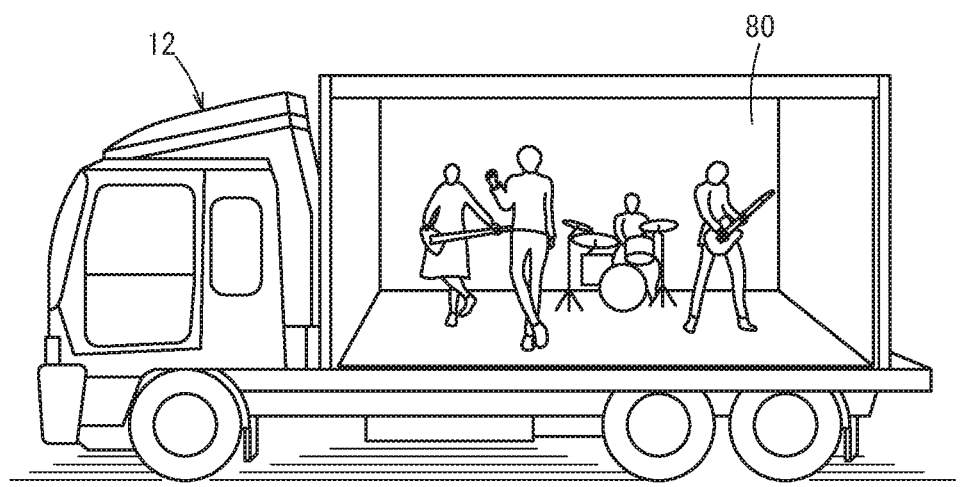

Meanwhile, in the second carpool system 10B, the professional musician can perform the promotion as described above. In this case, as illustrated in FIGS. 12A and 12B, for example, it is preferable to provide a means for adjusting visibility from the outside of the vehicle 12 to the inside thereof. As a component for adjusting the visibility, a liquid crystal shutter 80 is preferably used, for example.

FIG. 12A illustrates a state in which transmissivity of the liquid crystal shutter 80 is decreased so that the inside of the vehicle 12 is not visible outside the vehicle. FIG. 12B illustrates a state in which transmissivity of the liquid crystal shutter 80 is increased so that the inside of the vehicle 12 is visible outside the vehicle. Therefore, in FIG. 12B, people can see the performance of the professional musicians inside the vehicle 12, for example, from outside the vehicle 12.

In this case, for example, the liquid crystal shutter 80 may be provided to one side surface of the vehicle 12. With this structure, the transmissivity of the liquid crystal shutter 80 may be increased only while the musicians perform the music or the transmissivity may be increased in a pulsed manner to the rhythm of a bass drum played by the musician.

As described above, the carpool system 10 according to the present embodiment is the carpool system in which the automated driving vehicle 12 that can autonomously travel on the predetermined route or the route based on the request of each of the plurality of users is used communally by the plurality of users. The carpool system 10 includes: the riding condition setting unit 20 configured to set the attribute of each of the plurality of users as the riding condition for the users; and the attribute determination unit (reservation-time attribute determination unit 22, riding-time attribute determination unit 24) configured to, when the user rides the vehicle 12 or reserves the vehicle 12 for riding, determine whether the attribute of the user satisfies the riding condition.

When a search for a carpooler (user) is performed in advance, even if the system has found a matched person, e.g., a person who has a common taste or a friend, there is a case where, in the actual riding, the person who made the reservation might mistakenly ride another vehicle 12, or a person who has no reservation might ride the vehicle 12 by mistake.

In the present embodiment, however, when the user rides the vehicle 12 or reserves the vehicle 12 for riding, whether the attribute of the user satisfies the riding condition is determined. Therefore, at least the carpooler that was determined to satisfy the condition at the reservation can ride the reserved vehicle 12. Needless to say, a person who did not make the reservation in advance also can ride the vehicle 12 if the person satisfies the riding condition. That is, it is possible to flexibly deal with an unofficial participant.

In the present embodiment, the vehicle 12 includes: the speaker configured to reproduce sound at the predetermined volume or more; and the destination setting unit 40 configured to set as the destination 50, a site where the density level of buildings is less than or equal to the first predetermined value.

When the users hold an event with a large sound such as listening to music, playing musical instruments, or playing an online game, it is possible to set a site where the density level of the buildings is low, such as an open space or a vacant lot, as the destination of the vehicle. Therefore, the users can enjoy listening to music, playing musical instruments, or the like, without regard for the people around the vehicle. Needless to say, the users can also enjoy a chat, a party, or the like.

In the present embodiment, the carpool system 10 further includes the travel route setting unit 42 configured to select the route where the density level is less than or equal to the second predetermined value, as the route to the destination 50.

While the vehicle 12 is running to the destination 50, the users may have a chat or a party, listen to music, or the like in the vehicle. In this case, the sound in the vehicle leaks to the outside. Under such circumstances, in the present embodiment, the route where the density level of the buildings is less than or equal to the second predetermined value is selected as the route to the destination 50. Owing thereto, while the vehicle 12 is running, the users can enjoy a chat, a party, listen to music, or the like without regard for the people around the vehicle.

In the present embodiment, the carpool system 10 further includes the component (for example, liquid crystal shutter 80) configured to adjust visibility from the outside of the vehicle 12 to the inside of the vehicle 12.

For example, people can see the users (for example, professional musicians) play the instruments inside the vehicle 12, from the outside of the vehicle 12. Thus, the vehicle 12 can be used for the promotion, for example.

In the present embodiment, the vehicle compartment of the vehicle 12 includes the activity facility 206 configured to achieve a common purpose of the users.

For example, when the users play the instrument, the users only have to prepare and bring their own instruments because the guitar amplifier 208, the bass amplifier 210, the drum set 216, the speaker 218, and the like are set in advance as the activity facility 206 in the vehicle 12. That is, the users can use the vehicle 12 as if they played the instruments in a music studio.

Needless to say, if the activity facility is a facility where people can have a meal, for example, the users can have a party, a chat, or the like in the vehicle. In this case, if the activity facility is a facility that provides alcohol beverages, only the users who are old enough to drink alcohol may be permitted to ride the vehicle 12 by using the attribute representing the age among pieces of attribute information. Further, users who has the attribute representing the age that is less than or equal to a predetermined age may be prohibited from riding the vehicle 12 at particular times such as midnight. Furthermore, in a case of a members-only event or the like, information representing whether the user is a registered member may be set as one piece of the attribute information.

Note that this invention is not limited to the embodiment described above, and can be modified freely without departing from the scope of this invention.

What is claimed is:

1. A carpool system in which an automated driving vehicle that can autonomously travel on a predetermined route or a route based on a request of each of a plurality of users is used communally by the plurality of users, the system comprising:
    a riding condition setting unit configured to set an attribute of each of the plurality of users as a riding condition for the users;
    a reservation-time attribute determination unit configured to, when the user reserves the automated driving vehicle for riding, determine whether the attribute of the user satisfies the riding condition; and
    a riding-time attribute determination unit configured to, when another user who has not made a reservation requests to ride the automated driving vehicle, determine whether the attribute of the other user satisfies the riding condition, wherein the automated driving vehicle comprises a speaker configured to reproduce sound at a predetermined volume or more; and a destination setting unit configured to set as a destination, a site where a density level of buildings is less than or equal to a first predetermined value.

2. The carpool system according to claim 1, further comprising a travel route setting unit configured to select a route where the density level is less than or equal to a second predetermined value, as a route to the destination, wherein the second predetermined value is higher than the first predetermined value.

3. The carpool system according to claim 2, wherein the first predetermined value is in a range from 20% to 30%, and the second predetermined value is in a range from 30% to 40%.

4. The carpool system according to claim 1, further comprising a component configured to adjust visibility from an outside of the automated driving vehicle to an inside of the automated driving vehicle.

5. The carpool system according to claim 4, wherein, the component is a liquid crystal shutter.

6. The carpool system according to claim 1, wherein a vehicle compartment of the automated driving vehicle includes an activity facility configured to achieve a common purpose of the users.

7. The carpool system according to claim 1, further comprising:
    an entry key issue unit configured to, when the user reserves the automated driving vehicle for riding, issue an entry key if the attribute of the user satisfies the riding condition; and
    a door unlock processing unit configured to, if the entry key matches the automated driving vehicle, unlock a door of the automated driving vehicle.

* * * * *